US006530405B1

(12) United States Patent
Brown et al.

(10) Patent No.: US 6,530,405 B1
(45) Date of Patent: Mar. 11, 2003

(54) ON/OFF-ROAD TREAD (75) Inventors: Stephanie Carol Brown, Akron, OH (US); Michael Alois Kolowski, Mogadore, OH (US); Paul Bryan Maxwell, Kent, OH (US); Billy Joe Ratliff, Jr., Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/744,459

(22) PCT Filed: Mar. 2, 1999

(86) PCT No.: PCT/US99/04533

§ 371 (c)(1),
(2), (4) Date: Jan. 23, 2001

(87) PCT Pub. No.: WO99/52720

PCT Pub. Date: Oct. 21, 1999

Related U.S. Application Data (63) Continuation-in-part of application No. 29/097,354, filed on Dec. 4, 1998, now Pat. No. Des. 414,727, which is a continuation-in-part of application No. 29/092,741, filed on Aug. 26, 1998, now Pat. No. Des. 413,287.

(51) Int. Cl.$^7$ ................. B60C 11/11; B60C 107/00; B60C 121/00
(52) U.S. Cl. .................. 152/209.16; 152/209.18; 152/902
(58) Field of Search .............. 152/209.12, 209.16, 152/209.18, 902

(56) References Cited

U.S. PATENT DOCUMENTS

| 917,612 | A | * | 4/1909 | Kempshall |
| D62,972 | S | * | 8/1923 | Wolfe |
| D92,281 | S | * | 5/1934 | Anderson |
| 3,645,314 | A | * | 2/1972 | Verdier |
| 3,739,828 | A | | 6/1973 | Schaevitz ............... 152/209 R |
| 3,811,488 | A | * | 5/1974 | Duncan |
| 4,823,855 | A | * | 4/1989 | Goergen et al. |
| 4,881,586 | A | * | 11/1989 | Shinomiya |
| 5,085,259 | A | | 2/1992 | Goergen et al. ........ 152/209 R |
| 5,088,536 | A | * | 2/1992 | Graas et al. |
| 5,343,914 | A | | 9/1994 | Wako ..................... 152/209 R |
| 5,361,814 | A | | 11/1994 | Covert et al. ........... 152/209 A |
| 5,407,005 | A | * | 4/1995 | Consolacion et al. |
| D413,287 | S | * | 8/1999 | Brown et al. |
| D414,727 | S | * | 10/1999 | Brown et al. |
| 2002/0011293 | A1 | * | 1/2002 | Zanzig et al. |

FOREIGN PATENT DOCUMENTS

| AU | 37769/78 | * | 1/1980 |
| EP | 0273056 | | 7/1988 |
| EP | 0467146 | | 1/1992 |
| EP | 0543661 | | 5/1993 |
| FI | 32136 | * | 5/1962 |
| JP | 3-31008 | * | 2/1991 |
| JP | 4-81306 | * | 3/1992 |
| WO | WO 98/03356 | * | 1/1998 |
| WO | 9808697 | | 3/1998 |

OTHER PUBLICATIONS

Patent Abstracts of Japan, vol. 014, No. 473 (M–1035), Oct. 16, 1990, and JP 02 189206 A (Sumitomo Rubber Ind Ltd), Jul. 25, 1990.
Patent Abstracts of Japan, vol. 015, No. 160 (M–1105), Apr. 22, 1991, and JP 03 031008 A (The Ohtsu Tire & Rubber Co Ltd), Feb. 8, 1991.

* cited by examiner

*Primary Examiner*—Steven D. Maki
(74) *Attorney, Agent, or Firm*—David L. King (57) ABSTRACT

An on/off-road tread (40) for passenger or light truck tire (10) has an off-road tread (40) including a central on road tread (100). The tread (40) extends from at or above a radial location of the maximum section width $S_W$ of the tire (10) but less than a radial location of 65% of the section height $S_H$ of the tire (10).

4 Claims, 6 Drawing Sheets

ND/OFF-ROAD TREAD

This is a continuation in part of application Ser. No. 29/097,354, filed Dec. 4,1998, now U.S. Pat. No. Des. 414,727, which is a continuation in part of application Ser. No. 29/092,741, filed Aug. 26, 1998, now U.S. Pat. No. Des. 413,287.

TECHNICAL FIELD

The following invention relates to a tread for a tire more specifically for a tread designed for road usage and off-road usage for passenger or light truck vehicles.

BACKGROUND OF THE INVENTION

Tires generally have a tread that is well-suited for a specific vehicle application. For example, pneumatic tires used primarily on paved surfaces generally have a high proportion of the tread in contact with the road. These tires generally have a net-to-gross ratio in excess of 70%. This means that 70% or more of the area within the tires' footprint or contact patch is touching the road while 30% less is the void area representing the tires' grooves within the footprint area. These tires, due in part to the large amount of tread in contact with the road, can yield very good tread mileage sometimes in excess of 75,000 miles during the tires' normal life.

All season type tires can fall into this category of tires. All season tires have somewhat laterally extending grooves in each shoulder of the tread. These lateral grooves enhance snow traction performance.

If, however, the vehicle owner wants increased traction on snow, tires having a more aggressive open tread pattern have been used for this purpose. These snow tires generally have a lower net-to-gross ratio and almost always a large amount of leading edges on block elements to provide increased traction.

When the vehicle owner wants a tire that can operate both on the roadways as well as in snow, mud and sand, he generally must select an on/off road tread.

Typically, a serious off-road enthusiast may choose a tire designated as a mud tire. These tires are very open, tending not to clog in the mud.

In U.S. Pat. No. 5,085,259, a tread pattern having a plurality of ground engaging block elements arranged in a directional tread pattern is disclosed. This patented tread pattern is employed on a commercially available tire sold as the Goodyear WRANGLER MT. The MT, mud tire designation has signified to off-road enthusiast that the tire was well-suited for off-road applications. A measure of the tires' off-road worthiness was one of its first applications, the U.S. Army Hummer vehicle. This tread had excellent on/off road capabilities and throughout this patent application several references to testing will be made wherein the comparison or control tire is this prior art tire. As mentioned, the tread pattern of the WRANGLER MT was directional; that means that the tread pattern had a preferred direction of travel. Traction capabilities of the tire are enhanced in the preferred direction of travel. The most easily understood comparison is farm drive tires where the tread lugs pull the tractor through the soil. This nondirectional feature means that the tire must have two sets of molds—one for each side of the vehicle. This increases tire costs.

In European Patent Application 0 273 056, Noma et al discloses a Radial Tire and Assembly of Radial Tire and Rim that has a tread which is wider (in the axial direction) than the maximum width of said carcass and this document is considered to represent the most relevant state of the art.

Another problem associated with the very aggressive treads is that the high void areas means that when the tire is used on paved roads, the tread is very noisy, exhibits bad vibrational characteristics and has generally poor treadwear.

It is generally understood in the tire art that tread design is a matter of trade-offs aggressive off-road treads have to give up noise performance vibration and treadwear whereas good road tires are poor in off-road applications.

One of the objectives of the present invention is to provide an on/off road tread that has good on-road treadwear while showing excellent off-road traction.

Another objective is to design a non-directional tread with performance characteristics equal to or superior to the directional tread patterned tires.

Another objective of the invention is to design a tread that has a total tread width for off-road including a narrower road contacting central portion for on-road use.

These objective and other advantage can be achieved by the inventive on/off tread for a tire as disclosed herein.

DISCLOSURE OF THE INVENTION

Summary of the Invention

An on/off road tread 40 for a passenger or light truck tire 10 extending circumferentially about the axis of rotation R of a tire is disclosed. The tire 10 has a casing 12, a maximum section width $S_w$ and a maximum section height $S_H$. The tread 40 has a plurality of block elements 41, 42, 43 projecting outwardly from the tire casing 12 from a location at or above a radial location of the maximum section width $S_w$ of the tire 10, but less than 65% of the section height $S_w$ of the tire 10; a central portion 100 of the tread 40 being for on and off-road traction while the remainder of the tread 40 being for off-road traction.

The tread's central portion 100 is measured between first lateral edge 44 and second lateral edge 46. The distance halfway between the lateral edges 44, 46 defines the equatorial plane (EP) of the tire 10 which divides the tread into a first tread half 110 and a second tread half 120.

In the preferred embodiment of the invention within the central portion 100, the tread 40 has four rows 1, 2, 3, 4 of block elements 41, 42, 43 separated by three circumferentially continuous grooves 54, 55, 56. The first tread half 110 has a first and second row. The first row 1 of shoulder block elements have an array of long block elements 41 extending from the first lateral edge 44 and circumferentially adjacent each long block element 41 is a short block element 43 offset axially award from the first lateral edge 44. Each long and short block element 41, 43 has an axially aligned inner portions 74 divided by an inclined semi-blind groove 76, the semi-blind groove 76 extending less than halfway into each block element 41, 43.

A second central row 2 of block elements 42 are axially inward of the first row. The second row 2 has block elements 42 having an elongated circumferential shape extending inclined circumferentially from the equatorial plane toward an axially outer portion 77, the axially outer portion 77 is divided by an inclined semi-blind groove 78 circumferentially aligned but oppositely inclined relative to the semi-blind groove. 76 of the adjacent shoulder block element 41, 43.

The second tread half 120 has a third row 3 and a fourth row 4, the third row 3 is the same as the second row 2, the fourth row being the same as the first row. Both the third row 3 and fourth row 4 being oppositely oriented relative to the respective first and second rows.

The on/off-road tread for a tire has the central portion of the tread divided into three tread zones 60, 61, 62—a first shoulder zone 61, a second shoulder zone 62 and central zone 60. Each shoulder zone 61, 62 extends from a lateral edge 44, 46 to a circumferential centerline of a circumferential groove 54, 55. The circumferential centerline is defined as midway between peak amplitudes on each of the respective circumferential grove 54, 55, 56. The first and second shoulder zones 61, 62 preferably have equal net-contact areas while the central zone 60 has a net contact area greater than the first or second zones contact area, preferably at least 10% greater than a shoulder zone, more preferably the central zone 60, has a net-to-gross ratio greater than 50%.

The increased traction of the tread is achieved primarily from a plurality of block elements 41, 42, 43 that have a plurality of leading traction edges 50. The sum of the lengths of the leading traction edges 50 adjacent a groove of the tread 40 being at least 150% of the sum of the length of the leading traction edges 50 adjacent a groove of the central portion 100 of the tread 40.

DEFINITIONS

For ease of understanding this disclosure, the following items are disclosed:

"Aspect ratio" of the tire means the ratio of its section height (SH) to its section width (SW) multiplied by 100% for expression as a percentage.

"Asymmetric tread" means a tread that has a tread pattern not symmetrical about the centerplane or equatorial plane EP of the tire.

"Circumferential" means lines or directions extending along the perimeter of the surface of the annular tread perpendicular to the axial direction.

"Equatorial plane (EP)" means the plane passing midway between the width of the tread and perpendicular to the tire's axis of rotation.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves that they interconnect, they are regarded as forming "tie bars" tending to maintain a rib-like character in the tread region involved.

"Inboard side" means the side of the tire nearest the vehicle when the tire is mounted on a wheel and the wheel is mounted on the vehicle.

"lateral" means an axial direction.

"Net contact area" means the total area of ground contacting elements between defined boundary edges divided by the gross area between the boundary edges as measured around the entire circumference of the tread.

"Net-to-gross ratio" means the total of ground contacting tread elements between the lateral edges around the entire circumference of the tread divided by the gross area of the entire tread between the lateral edges.

"Non directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning. "Axial" and "axially" means lines or directions that are parallel to the axis of rotation of the tire.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction.

"Tread element" or "traction element" means a rib or a block element.

DETAILED DESCRIPTION OF THE INVENTION

With reference to FIGS. 1–5, a tire 10 having a tread 40 according to a preferred embodiment of the present invention is shown. The tread 40 when configured annularly has an axis of rotation R, first and second lateral edges 44, 46.

The tread 40 has a plurality of ground engaging ion elements 41, 42, 43 separated by circumferential grooves 54, 55, 56 and lateral grooves 57, 58. Each traction element 41, 42, 43 extends radially outwardly from a tread base 45 to a radially outer surface 52. The lateral grooves 57, 58 may preferably intersect and join to form a continuous lateral groove path across the entire tread width. Alternatively, the lateral grooves 57, 58 may begin or end at locations which are laterally or circumferentially spaced and never connecting, except that they may meet at a common circumferential groove 54, 55. The traction elements 41, 42, 43 as shown are block elements. The tread 40 as illustrated in FIGS. 1–5 has an on-road central portion 100 having an overall or total net-to-gross ratio of about 47% measured from tread lateral edge 44 to tread lateral edge 46. It is believed that the tire 10 can be successfully produced with treads 40 having a central portion 100 having total or overall net-to-gross ratios between 40% and 70%, preferably 40% to 50%.

The central portion 100 of the tread 40 is divided laterally into three tread zones, 60, 61, 62. The central zone 60 is positioned between the two circumferential grooves 54, 55. The first shoulder zone 61 is located between the first lateral edge 44 and the first circumferential groove 54. The second shoulder zone 62 is located between the second lateral 46 edge and the second circumferential groove 55. The first or second tread zones 61, 62 are intended to be mounted on either the outer or outboard side of the vehicle not shown) or on the inboard side. The first and second tread zones 61, 62 preferably have a net contact area less than the central tread zone 60. The central tread zone 60 preferably has a high net contact area greater than either the value of the first zone 61 or the value of the second tread zone 62. Each zone is defined as the area between specified boundary edges. The first zone 60 has boundary edges defined by two planes, one plane passing through the respective centerlines of each circumferential groove 54 and 55. The first zone 61 has boundary edges defined by the lateral edge 44 and a plane passing through the centerline of groove 54 closest in proximity to the lateral edge 44. The second zone 62 has boundary edges defined by the second lateral edge 46 and a plane passing through the centerline of the groove 55.

Figure 2:
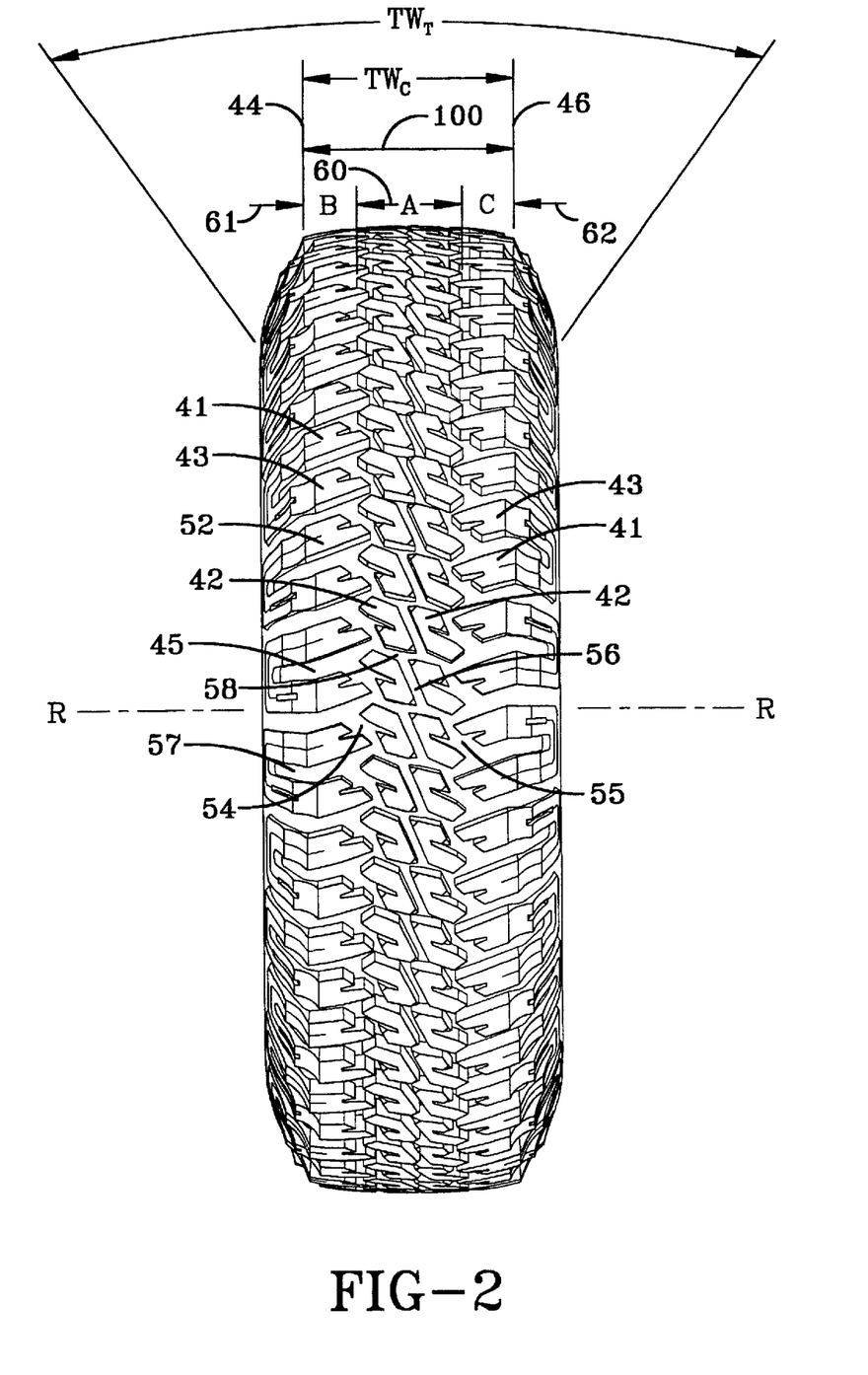
FIG. 2 is a plan view of the tire of FIG. 1.

With particular reference to FIG. 2, it can be seen that the central tread zone 60 has an average tread road contacting axial width A, the first tread zone 61 an average tread road contacting axial width B, and the second zone 62 an average tread road contacting axial width C. In the preferred embodiment, the axial width A is greater than B or C, and axial width B is equal to C. Also, groove 54 has an average axial width D while groove 55 has an average axial width E,E being preferably equal to D. These subtle features provide very specific and significant improvements. The central zone 60 when used on the lightly loaded rear wheel position of a light truck on paved surfaces bears most of the load. Zone 60 has the greatest axial width. The central zone 60 has a net-to-gross ratio of 50%, preferably about 51%, and an overall axial width equal to or greater than 40%, preferably about 46% of $TW_C$, $TW_C$ being the tread width of the central portion 100. The first shoulder tread zone 61 has a net-to-gross ratio of about 40%, preferably about 44%, and an axial width of greater than 25%, preferably about 27% of $TW_C$. The second tread zone 62 similarly has a net-to-gross ratio of 44% and an axial width of about 27% of $TW_C$. Groove 54 has an average, width D of about 7.0% of $TW_C$ and groove 55 has an average axial width E of 7.0% of the tread width TW. The wide groove 54 adjacent the second tread zone 61 is about equal in width to the opposite wide groove 55 adjacent the third zone 62. This feature permits the second and third zones 61, 62 to exhibit relatively high net-to-gross ratios improving wear and noise while maintaining the overall traction performance. In the development tire having a 33×12.5R15 size, a very important feature is demonstrated that further enhances uniform treadwear and improved traction. The actual contact area A of the middle zone 60 is 46%×$TW_C$×π×diameter of the tread×51%. This relationship yields a contact area in the central zone 60 that is greater than the second or third zones 61, 62 by more than 20%. Therefore, the zone 60 has a net-to-gross ratio greater than zone 61 and 62 by about 10% yet due to its increased width has a road contacting area greater than the zones 61 and 62 by preferably at least 20%.

Figure 1:
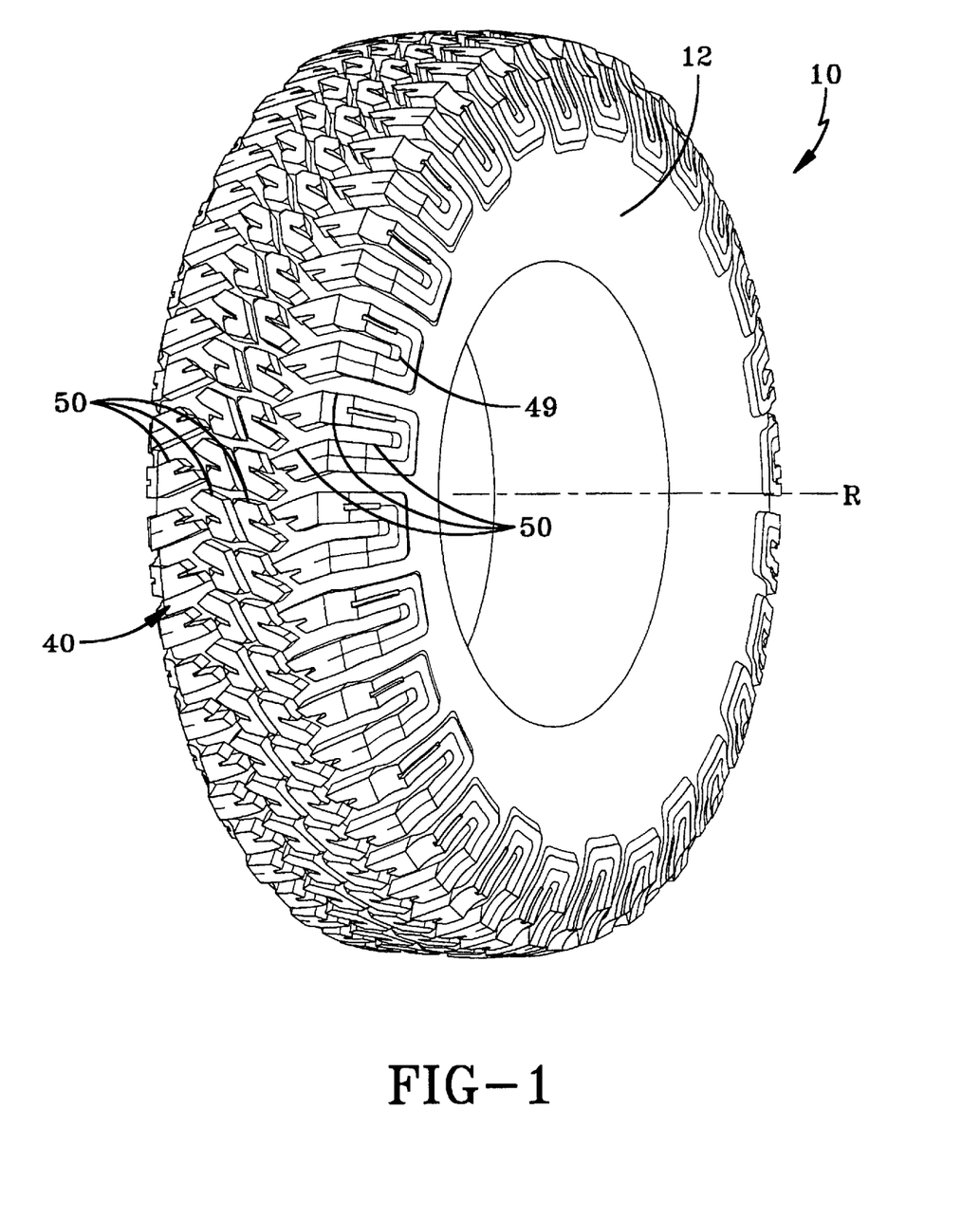
FIG. 1 is a perspective view of the tire according to a preferred embodiment of the invention.
Figure 3:
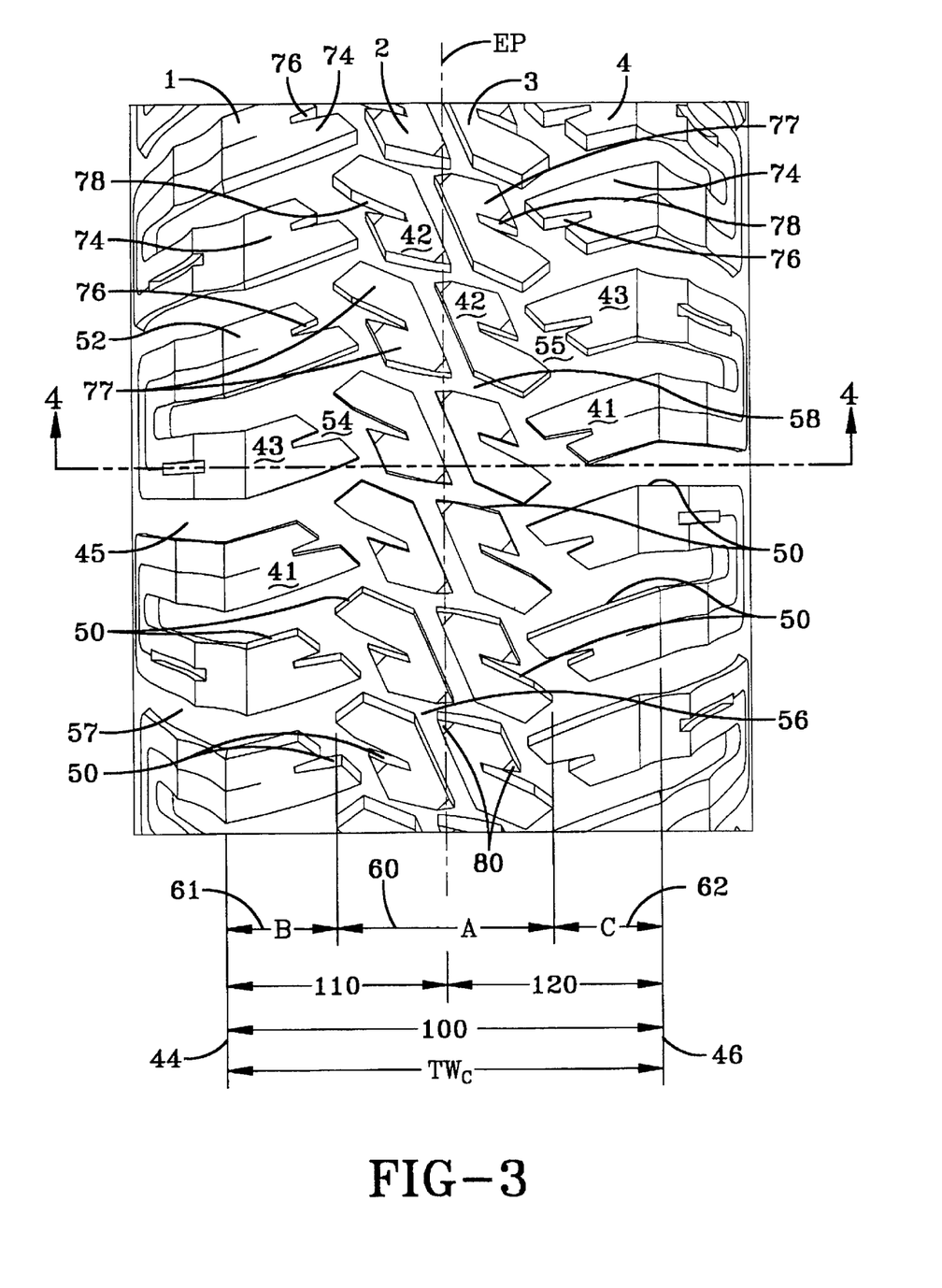
FIG. 3 is an enlarged fragmentary view of the tire of FIG. 2.

With reference to FIGS. 1–3, the treads divided into four rows 1, 2, 3, 4 of block elements 41, 42, 43, each row 1, 2, 3, 4 being separated by a circumferentially continuous groove 54, 55, 56. The first shoulder row 1 of block elements are arranged with laterally elongated block elements 41, 43, one long block element 41 extending from a first lateral edge 44 axially inwardly. Adjacent each long block element is a short block element 43. The short block elements 43 have an axially outer end 71 offset and spaced axially inward from the lateral edge 44. Both the long block element and the adjacent short block element 43 extend axially inwardly to axially inner end 70, 72, the respective inner ends 70, 72 being similar in shape and orientation and preferably are axially aligned. The block elements 41, 43 have an axially inner portion 74 divided by an inclined semi-blend groove 76.

The second row 2 of block elements 42 are circumferentially elongated extending axially outwardly from the equatorial plane (EP) to an axially outer portion 77 divided by a semi-blind groove 78, the semi-blind groove 78 being circumferentially aligned but oppositely inclined relative to an adjacent semi-blind groove 76 of the shoulder block elements 41, 43. As further illustrated, the corners 80 of the block elements 42 having acute included angles are chamfered.

The third row 3 of block element 42 are preferably the same in appearance overall shape of those of row 2 but oppositely oriented. Similarly, the fourth row of shoulder block elements preferably has the long elements 41 and the short elements 43 the same in appearance and shape as those in the first row, the first and second rows 1, 2 lie in-between the first lateral edge 44 and the equatorial plane (EP) while the third and fourth rows 3, 4 lie in-between the second lateral edge 46 and the equatorial plane (EP).

As will be readily appreciated, the net contact area of the traction elements 41, 42, 43 between the lateral edges 44, 46 provide the on-road tread central portion 100.

This central portion 100 provides excellent wear characteristics without sacrificing off-road performance. A key feature of this tread 40 is that it extends well beyond the lateral edges 44, 46.

Figure 4:
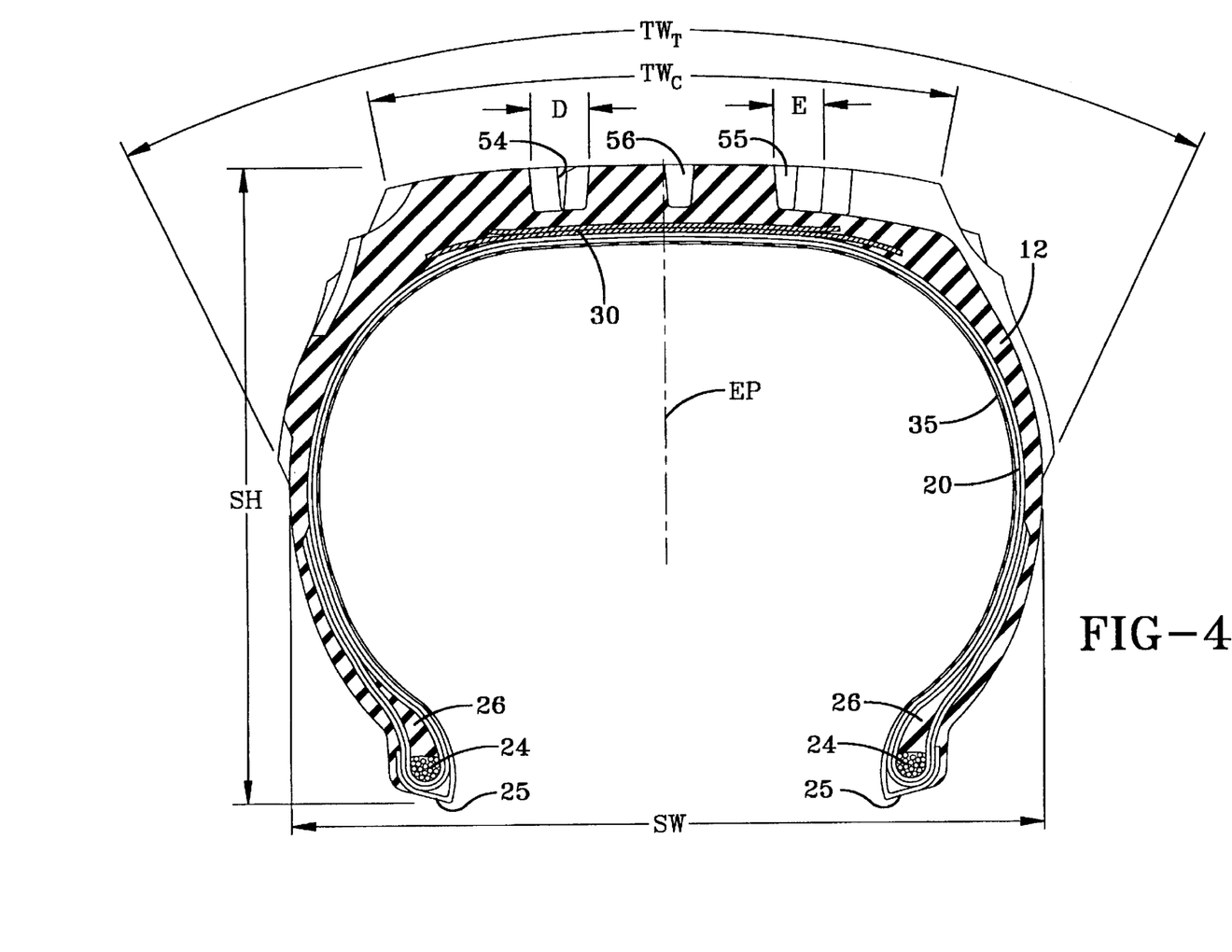
FIG. 4 is a cross-sectional view of the tire taken along line 4—4 of FIG. 2.

As shown in FIG. 4, the tire 10 preferably has a casing 12 having one or more plies 20 extending from an annular tensile member 24 through the sidewall and radially inward of the tread 40 to an opposite annular tensile member 24. Interposed between the plies 20 and the tread is a belt reinforcing structure 30 having at least two layers of cord reinforced layers. Radially inward of the plies 20 is an air impervious liner 35. Radially inward of the bead a fabric toe guard 25 may be employed. A bead apex 26 lies above the annular tensile members 24. These components generally comprise the elements needed to form a tire.

In the practice of this invention, various rubber compositions may be used for the tire sidewall. Representative of such composition comprise, for example, a blend of natural rubber and cis 1,4-polybutadiene which contain, as a reinforcement, a combination of carbon black and precipitated silica together with a coupling agent (for example, see U.S. patent application Ser. No. 09/159,663 filed Sep. 24, 1998).

As can be seen in the cross-sectional view of FIG. 4, the traction elements 41, 43 begin at a location at or above the radial location of the maximum section width and accordingly define the total tread width $TW_T$. The elements 41, 43 protrude outwardly from casing or tread base 45 of the tire 10 and provide additional traction leading edges 50 for off-road applications such as mud, sand, or snow. These additional traction edges 50 provide at least 150% more leading edges in the tread 40 when compared to the leading edges 50 of the on-road central portion 100 of the tread 40. The overall net-to-gross ratio of the tread as measured in the $TW_T$ zone is at least 50%, preferably about 53.8%. The areas between the edges of the tread 44, 46 to the radially innermost portion of the tread being 58%.

Preferably, these protruding traction elements 41, 43 extend radially to a location 65% or less of the section height $S_H$ of the tire 10. Unlike most shoulder treatments found in the upper sidewall of a tire that blend into the tire's sidewall, the traction elements 41, 43 of the present invention are protruding outwardly and are truly part of the tread 40.

Due in part that these sidewall protruding portions of the tread 40 only work in soft off-road applications, it has been determined that the traction elements 41, 43 need only extend outwardly a distance about ¼ of the non-skid depth of the tread 40 as measured in the central portion 100. This amount of area extending outwardly from the tread 40 greatly enhances off-road traction.

Figure 5:
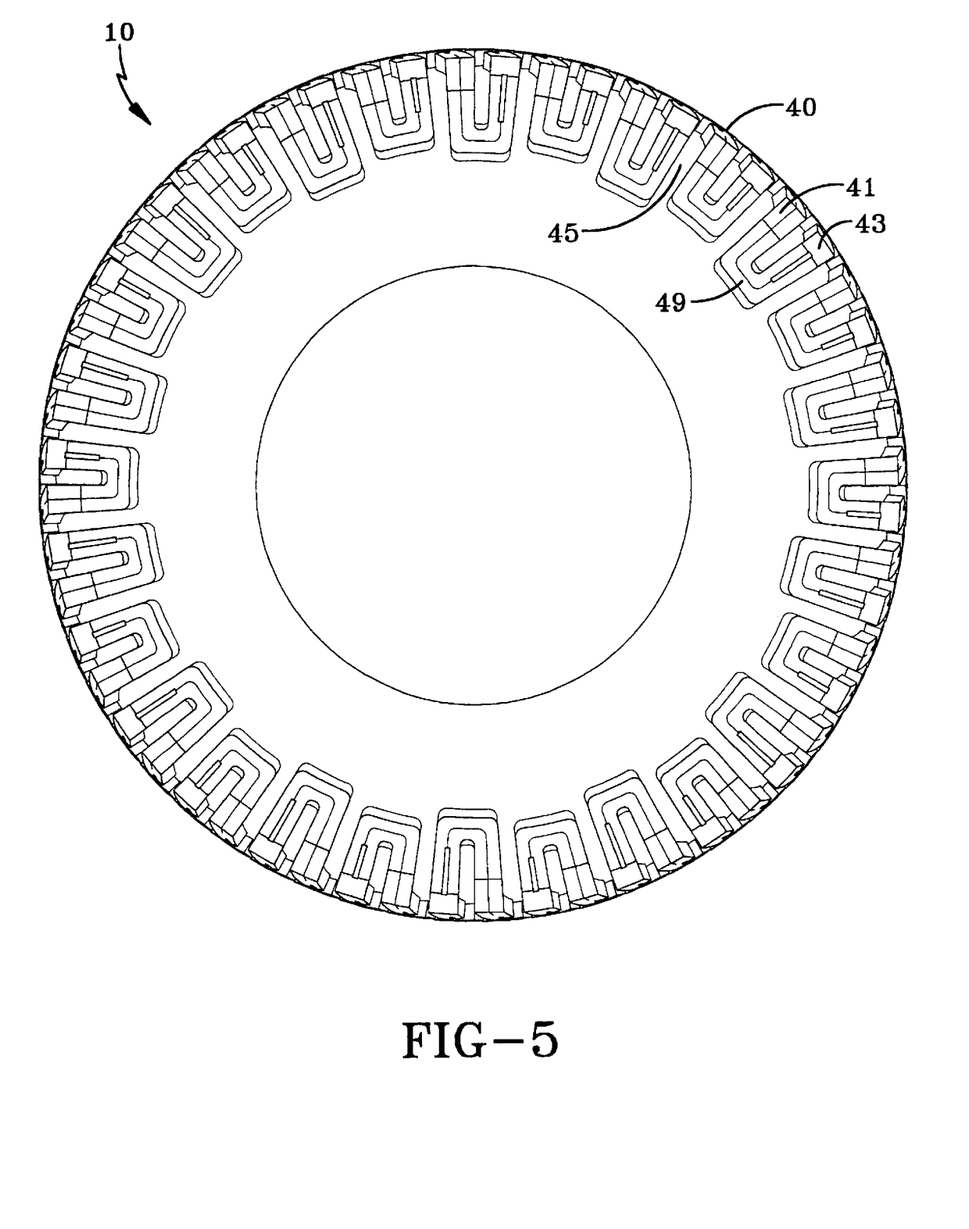
FIG. 5 is a side view of the tire of FIG. 1.

As illustrated in FIG. 5, each shoulder block element 41, 43 preferably extends over the tread's shoulder down the sidewall as described above. In the preferred embodiment, one adjacent long block element 41 and a short block element 43 are connected by a circumferentially extending portion 49. This preferred feature ties the traction elements 41, 43 together enhancing the sidewall stiffness and creating a particularly durable traction feature.

A primary benefit of the tread design of the present invention is that the central portion 100 of the tread 40 is of a finite and limited area. Thus, to increase on-road treadwear, performance meant that off-road performance would be sacrificed. By providing the on-road central area 100 with the added tread width beyond each lateral edge 44, 46 along the sidewalls as described above meant that both on-road wear and off-road traction could be improved. Not only could the performance be improved, the present invention makes it possible to achieve these improvements without requiring a directional tread pattern.

The following test data compares the present invention tire to the WRANGLER® MT tire.

Figure 6:
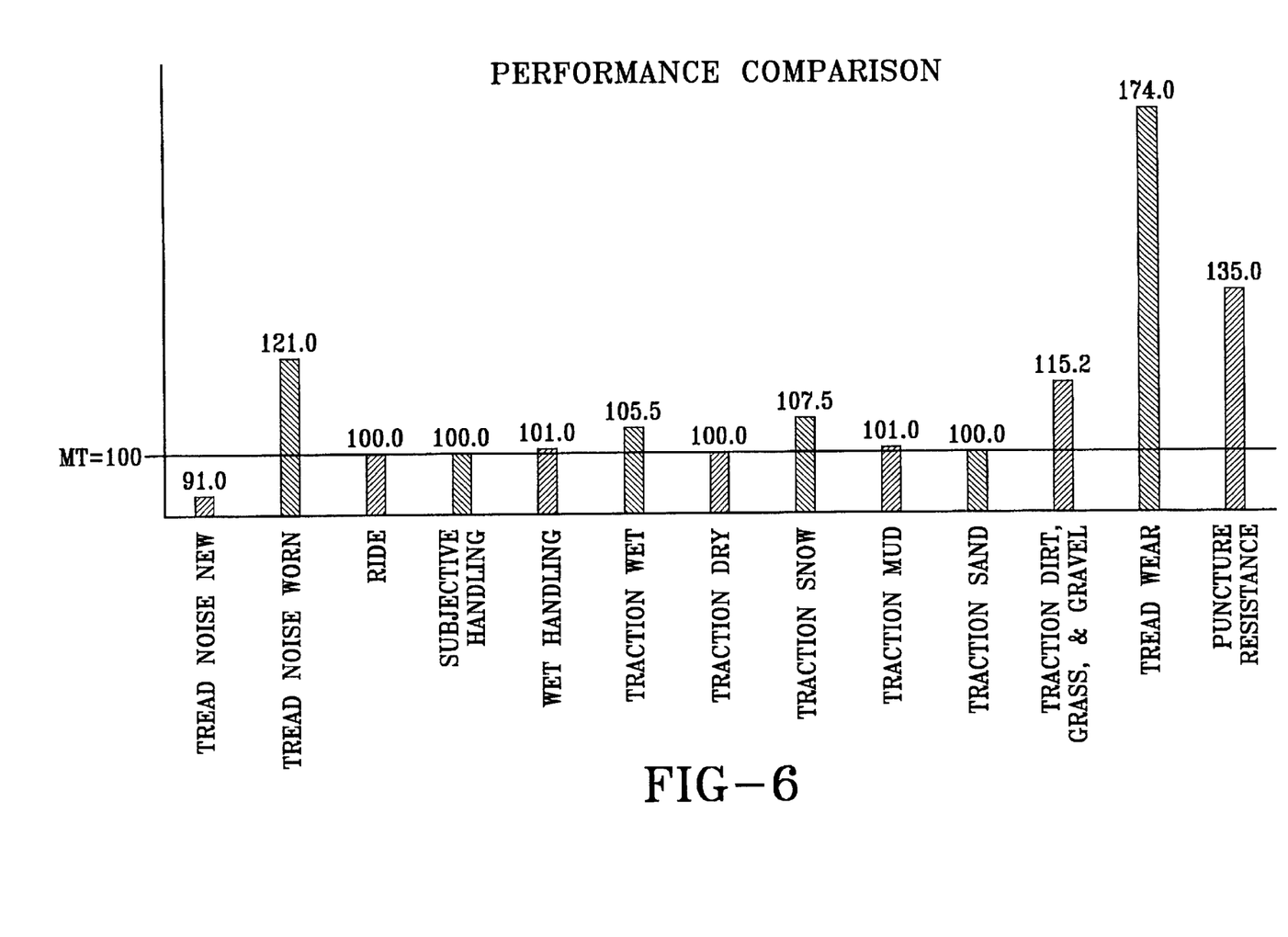
FIG. 6 is a graph of Performance Characteristics.

The graphical presentation illustrated in FIG. 6 shows the prior art directional tire described in U.S. Pat. No. 5,085,259, commercially sold as the Goodyear WRANGLER® MT tire used as a control tire. In each category, the control tire is set at a 100% level. A most interesting feature is that when the test tire was new, its tread noise ranked 91% of a new "MT" tire meaning it was noisier than the control tire. At 25,000 miles into the testing, the test tire tread noise level ranked 121% of the control tires or substantially quieted. In every other category, the test tire was equal to or superior to the control tire. Most noteworthy was the tremendous gains of 174% in treadwear testing while also gaining in traction in conditions of wet, snow, mud, gravel, and grass conditions. These benefits are most remarkable, particularly in a non-directional tire of the present invention in view of the directional pattern employed in the control tire.

While certain representative embodiments and details have been shown for the purpose of illustrating the invention, it will be apparent to those skilled in this art that various changes and modifications may be made therein without departing from the spirit or scope of the invention.

What is claimed is:

1. An on/off-road passenger or light truck tire having a tread extending circumferentially about the axis or rotation of the tire, the tire having a casing, a maximum section height $S_H$ and maximum section width $S_W$, the tread having a plurality of block elements extending from and projecting outwardly from the tire casing, from a radial location at or above a radial location of the maximum section width $S_W$ of the tire but less than 65% of the section height $S_H$, the tread having a total tread width $TW_T$, a central portion of the tread lying between a pair of lateral edges defining the tread width of the central portion as $TW_C$ wherein the plurality of block elements have a plurality of leading traction edges, the tread characterized in that the plurality of block elements have the sum of the leading traction edges adjacent a groove of the tread as measured between $TW_T$ being at least 150% of the sum of the length, of the leading traction edges adjacent a groove of the central portion of the tread as measured between $TW_C$; and wherein the tread central portion is measured between first and second lateral edges, the distance halfway between the lateral edges defining the equatorial plane EP of the tire, and dividing the tread into a first tread half and a second tread half within the central portion, the tread having first, second, third and fourth rows of block elements separated by three circumferentially continuous grooves, the first tread half having the first row and second row, the first row including shoulder block elements having an array of long block elements extending from the first lateral edge and an adjacent short block element offset axially inward from the first lateral edge, each long and short block element having axially aligned inner portions divided by an inclined semi-blind groove, the semi-blind groove extending less than halfway into each block element, the second row including block elements having an elongated circumferential shape extending inclined circumferentially from the equatorial plane EP toward an axially outer portion, the axially outer portion being divided by an inclined semi-blind groove circumferentially aligned but oppositely inclined relative to the semi-blind groove of the adjacent shoulder block element, the second tread half having the third row and the fourth row, the third row being the same as the second row, the fourth row being the same as the first row, both the third and fourth rows of block elements being oppositely oriented relative to the respective first and second rows.

2. The on/off-road passenger or light truck tire of claim 1 wherein the central portion of the tread is divided into three tread zones, a first shoulder zone, a second shoulder zone and a central zone, each shoulder zone extending from a lateral edge to a circumferential centerline of a circumferential groove, the circumferential centerline being midway between peak amplitudes on each side of the groove, the first shoulder zone and the second shoulder zone having equal net-contact areas and the central zone having a net-contact area greater than the first or second contact area.

3. The on/off-road passenger or light truck tire of claim 2 wherein the net-to-gross ratio of the central zone is at least 10% greater than the net-to-gross ratio of each shoulder zone.

4. The on/off-road tread for a passenger or light truck tire of claim 3 wherein the net-to-gross ratio of the central zone is greater than 50%.

* * * * *